UNITED STATES PATENT OFFICE.

R. McMULLIN, OF NEW BRUNSWICK, NEW JERSEY.

IMPROVEMENT IN PROCESSES FOR MAKING ELASTIC RUBBER CLOTH.

Specification forming part of Letters Patent No. 14,464, dated March 18, 1856.

*To all whom it may concern:*

Be it known that I, RICHARD McMULLIN, of New Brunswick, in the county of Middlesex and State of New Jersey, have invented a new and useful Improvement in Shirred India-Rubber Goods; and I do hereby declare the following to be a full, clear, and exact description of the same.

My invention relates to an improved method of preparing the rubber before applying the fabric which is to constitute the exterior of the shirred goods, by which an article of the same strength and elasticity and possessing greater durability can be produced at a less cost than when made in the usual way.

I may here premise that the rubber used for this purpose is that kind generally known as "vulcanized india-rubber," the preparation of which it is unnecessary for me here to describe, as patents have been granted in which the process has been specially set forth. I may, however, for the proper understanding of my improvement, state that sulphur constitutes one of the principal ingredients used in its manufacture.

In shirred goods as heretofore manufactured the prepared rubber is cut up into threads by a machine for that purpose, which are placed at short distances apart in a stretched condition between the cemented surfaces of two sheets of cambric cloth or other woven fabric. In this state it is passed through rolls either one of which has a series of grooves corresponding with the number and for the reception of the threads of rubber, to cause the two sheets of cemented cloth to adhere firmly together in the spaces intervening between the threads of rubber, there being little, if any, adhesion of the cement on the covering-cloth to the strips of rubber. This non-adhesion of the cement to the rubber arises from the presence of the sulphur used in vulcanizing the rubber, which neutralizes in a great measure its adhesive property; hence, the reason of cutting it up into strips or threads and the use of the grooved rolls, as it is necessary for the prepared cloths to be brought into close contact and caused to adhere to each other. This method of manufacturing such goods is liable to many and serious objections, inasmuch as there is a great waste of material both at the sides and ends of the sheet from which the threads are cut, and much time lost and labor expended in examining and arranging them to see that none but perfect ones are used—a result which would otherwise occur, as from the stretching nature of the material the knives cannot always cut it true and clean unless kept very sharp and in the best condition—a duty involving considerable labor as well as skill. Nor are they, after having been manufactured in this expensive way, nearly as durable as those prepared by my improved method.

The object of my invention is to supersede the necessity of cutting the sheet-rubber up into strips or threads, thereby obviating waste of material and economizing time and labor. While I effect this, I am enabled to produce a fabric of greater beauty, strength, elasticity, and durability from a less quantity of rubber; and it consists in again rendering the rubber adhesive after it has been vulcanized without injuring or destroying that property, whereby it is made to adhere firmly to the cloth on the application of the usual cement. This is effected by boiling the rubber (as used in the old method before being cut up into strips) in a solution of potash until a sufficient portion of the sulphur has been removed to render it adhesive—a result which will be more or less expedited, according to the strength of the solution used. When thus prepared it is ready to receive the cement, (the same as that in general use, prepared by dissolving the pure gum or rubber in camphene,) which is spread over both its sides, and also over one side of each piece of cloth or other fabric with which the rubber is to be covered. The cloth is then applied to the rubber in the usual way, while the latter is kept at the requisite tension to give the goods the necessary degree of elasticity, the whole being passed between rolls to cause them to adhere firmly together.

It may be proper to state that the sheet of rubber may either have a rough or smooth surface; but the former is preferable, as it assists the adhesion of the cement. The rolls may either have smooth or grooved surfaces, as may be desired; but I deem it best to use smooth rolls, as they insure better and more regular adhesion of all parts of the surface of the rubber and cloth, although a ribbed or figured article may be produced on one side of the cloth by having the required device upon the periphery of one of the rolls.

What I claim as new, and desire to secure by Letters Patent, is—

Rendering vulcanized india-rubber for the manufacture of shirred goods adhesive by boiling it in a solution of potash to remove the sulphur from its surface, thus fitting the sheet of rubber to receive a coat of cement, whereby it is caused to adhere firmly to the cloth or other fabric between which it is placed, in the manner and for the purposes substantially as herein set forth.

In testimony whereof I hereunto subscribe my name in the presence of two subscribing witnesses.

R. McMULLIN.

Witnesses:
P. HANWAY,
WM. M. McCAULEY.